United States Patent [19]

Kissel et al.

[11] Patent Number: 4,659,977
[45] Date of Patent: Apr. 21, 1987

[54] MICROCOMPUTER CONTROLLED ELECTRONIC ALTERNATOR FOR VEHICLES

[75] Inventors: William R. Kissel, Milford; Min Sway-Tin, Troy; Daniel P. Merchant, Warren; Douglas C. Frantz, Berkley, all of Mich.

[73] Assignee: Chrysler Motors Corporation, Highland Park, Mich.

[21] Appl. No.: 655,806

[22] Filed: Oct. 1, 1984

[51] Int. Cl.$^4$ .............................. H02J 7/14; H02J 7/24
[52] U.S. Cl. ........................................ 320/64; 320/35; 322/14; 322/28; 322/33; 322/99
[58] Field of Search .................... 322/14, 23, 28, 33, 322/15, 99; 320/36, 37, 39, 62, 64, 35; 180/77 R; 123/359; 307/87

[56] References Cited

U.S. PATENT DOCUMENTS

| 3,192,394 | 6/1965 | Teter | 322/15 X |
|---|---|---|---|
| 3,535,616 | 10/1970 | Rutherford et al. | 322/33 X |
| 3,918,543 | 11/1975 | Halem | 180/282 |
| 4,136,311 | 1/1979 | Scheidler | 320/37 X |
| 4,308,492 | 12/1981 | Mori et al. | 322/23 X |
| 4,322,630 | 3/1982 | Mezera et al. | 307/87 X |
| 4,463,305 | 7/1984 | Wineland et al. | 320/62 X |
| 4,475,518 | 10/1984 | Kashiwaya et al. | 123/339 X |
| 4,536,697 | 8/1985 | Johnston et al. | 322/14 |
| 4,543,521 | 9/1985 | Morishita et al. | 320/39 |
| 4,553,516 | 11/1985 | Hasegawa | 123/339 |

FOREIGN PATENT DOCUMENTS 2495384  6/1982  France ............................... 320/62

Primary Examiner—R. J. Hickey

Attorney, Agent, or Firm—Mark P. Calcaterra

[57] ABSTRACT

A microprocessor-based electronic voltage regulation system for controlling the charging of the battery in a vehicle. The conventional voltage regulator is eliminated and the intelligence of the microprocessor already present on the vehicle for controlling engine operation is used to regulate the output of the alternator. The battery temperature signal from a temperature transducer and a battery voltage signal from a sense line connected directly to the positive terminal of the battery are supplied to the microprocessor through an analog-to-digital converter. The microprocessor is programmed to ascertain from the battery temperature signal the desired set point voltage based upon an inverse first order relationship between battery temperature and desired battery voltage with preset maximum and minimum voltage set point levels. Energization of the field windings is controlled in accordance with a comparison between the desired set point voltage and the battery voltage signal on the battery sense line and is implemented in response to a control signal from the microprocessor by a solid-state power switching circuit which interfaces with the alternator field windings. In addition, the microprocessor is provided with additional feedback information relating to various driving conditions, such as vehicle deceleration, throttle position, engine RPM, and elapsed time since ignition, and is further programmed to modify the desired voltage set point or modify engine RPM in accordance with such driving conditions. Overcurrent protection for the logic circuitry and improved diagnostic capabilities are also provided.

22 Claims, 4 Drawing Figures

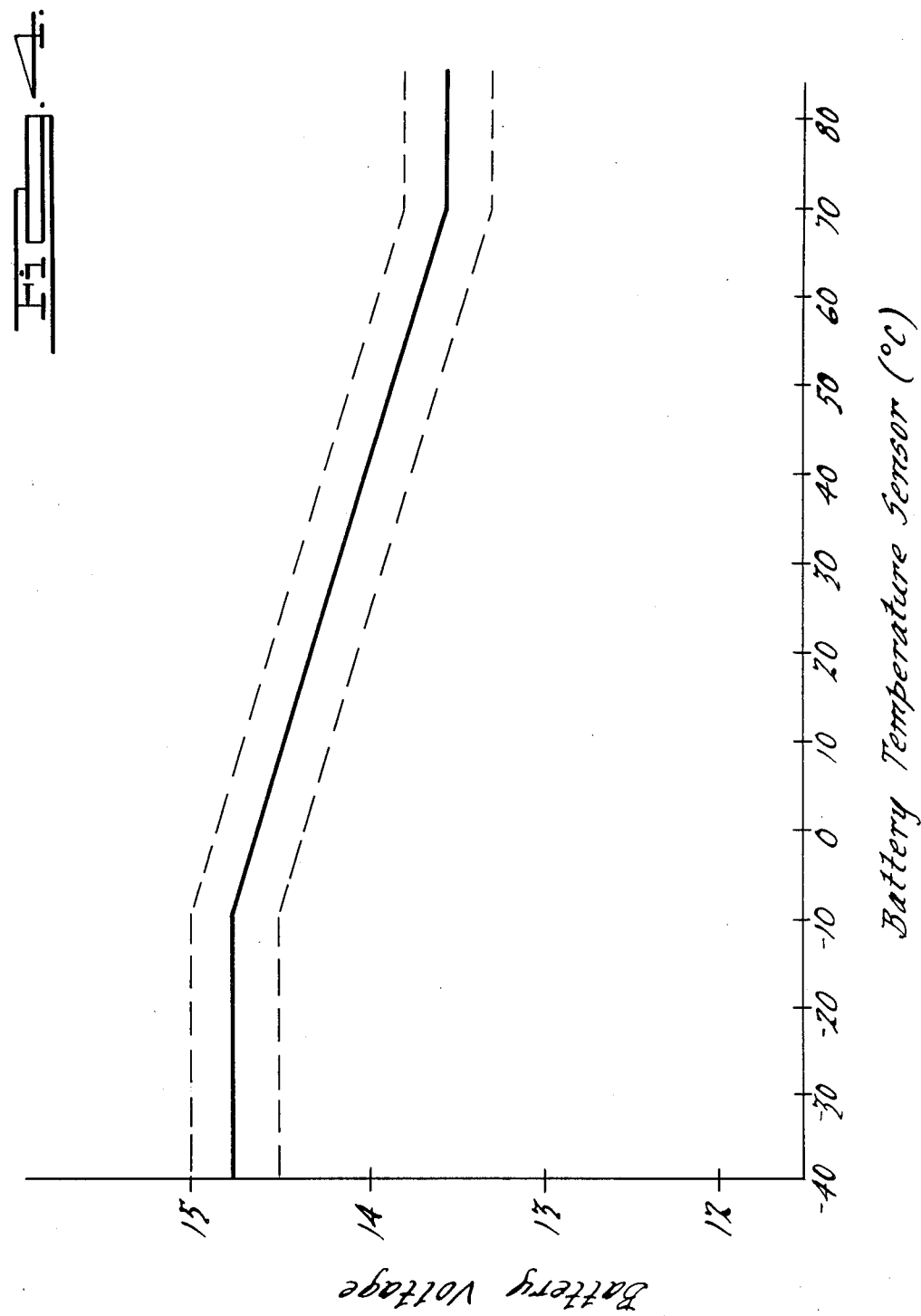

MICROCOMPUTER CONTROLLED ELECTRONIC ALTERNATOR FOR VEHICLES

BACKGROUND AND SUMMARY

The present invention relates to a microcomputer-based electronic control system for controlling the charging system in a motorized vehicle.

The basic function of the charging system in an automobile is, of course, to maintain a substantially constant battery voltage. A conventional automotive charging system includes two main components, the alternator and the voltage regulator. The alternator interfaces directly with the battery and is the source of energy that charges the battery. The output of the alternator is directly proportional to the current flow through its field windings at a given alternator RPM. The function of the voltage regulator is to control the output of the alternator in accordance with the voltage level of the battery by controlling current flow through the field windings of the alternator. In particular, when the battery voltage drops below a specified voltage level, the voltage regulator is adapted to sense this condition and apply current to the field windings of the alternator to thereby provide a charging current from the alternator to the battery. When the battery voltage reaches the desired voltage level, the voltage regulator interrupts current flow to the field windings of the alternator to stop the charging process. In practice, this procedure may repeat itself many times per second and is referred to as modulating the alternator field current.

The desired voltage level to which a battery is charged is dependent on the temperature of the battery. At sub-zero temperatures it is more difficult for the battery to hold a charge, and therefore the battery is charged to a higher voltage. Conversely at high temperatures the battery need only be charged to a lower voltage in order to hold a proper charge. To account for this temperature dependency, voltage regulators typically include a temperature sensing device that is physically associated with the voltage regulator to provide a temperature feedback signal that approximates the temperature of the battery.

Conventional voltage regulators comprise either a separate unit that is mounted to the firewall, shock tower, or other convenient location in the engine bay, or a unit that is constructed integral with the alternator. Both approaches possess disadvantages with respect to temperature and system load compensation. The separate voltage regulator approach, while providing reasonably accurate battery temperature tracking, involves the manufacture, assembly, and maintenance of an additional component and therefore is not widely used. The more common integral voltage regulator, however, assumes the temperature of the alternator and therefore does not accurately reflect battery temperature. Moreover, to provide a separate temperature sensor located near the battery would extract a substantial cost penalty.

To provide the voltage regulator with a signal indicative of battery voltage, it is desirable ideally to connect a battery feed sense line from the voltage regulator directly to the positive battery terminal. However, as conventional voltage regulators contain fairly low impedance devices, this would present an excessive battery drain when the ignition is off. Consequently, voltage regulators typically have their sense wires connected through the ignition switch or related relay. Since there exists a limited number of battery feeds to the ignition switch, the battery sense wire must therefore share the sense point with other loads (e.g., blower motor, light, etc.). As these common loads increase their current requirements, it similarly increases the possibility of substantial voltage drops across each connection, thereby lowering the voltage at the sense point. It can thus be seen that load compensation for conventional voltage regulators can depend significantly on the particular placement of the battery voltage sense wire to the voltage regulator.

It is the primary objective of the present invention to provide solutions to these problems by providing an improved charging system that eliminates the conventional voltage regulator and utilizes in its place the intelligence of a microcomputer already present on the vehicle for controlling engine operation. More particularly, it is an object of the present invention to utilize the sophisticated control capability of the microcomputer to regulate the output of the alternator.

In general, the present invention provides a computer-controlled charging system which includes a logic module containing the microcomputer and a separate power module containing the high current circuitry that interfaces with the alternator field windings, the battery sense point, and the battery temperature sensor. The logic module, which includes the electronics used to control engine operation, directly senses engine RPM, vehicle speed, and throttle angle or position. In addition, via the power module, the logic module is also supplied with information relating to battery voltage and battery temperature. By processing these inputs in a manner described in detail hereinafter the logic module is able to precisely regulate the output of the alternator and hence the charging of the battery. Moreover, by utilizing the intelligence of the microcomputer and the additional information regarding the operation of the vehicle available to the microcomputer, the present invention is capable of providing more efficient control of the alternator.

Specifically, the microcomputer in the preferred embodiment is adapted to sense when the vehicle is decelerating and charge the battery to a higher voltage level during such periods of deceleration. This serves to more efficiently utilize some of the energy represented by the momentum of the vehicle which is normally wasted in the converted form of heat as the vehicle is braked. Also, by charging the battery during deceleration, an additional load is placed on the engine which also serves to assist in slowing the vehicle.

In addition, the microcomputer is preferably adapted to charge the battery to a higher voltage level during the initial few minutes of operation after start-up of the engine to insure proper charge retention by the battery on short trips. Similarly, the present invention contemplates more precise control of engine RPM at idle to handle the charging load of the engine. This feature is, of course, particularly useful with the smaller four-cylinder engines widely in use today.

Furthermore, the present charging system provides improved voltage control at high and low temperature extremes by programming into the microcomputer upper and lower battery voltage limits to prevent damage to the vehicle lighting systems or other battery voltage sensitive components at such temperature extremes. By virtue of the input signal provided to the microcomputer relating to throttle position, the charging system in the preferred embodiment can also reduce or turn off altogether the charging function at wide-open throttle (WOT) settings to help minimize engine loading when maximum engine output is being demanded. In addition, the intelligence of the microcomputer used in the present charging system allows for improved diagnostic capability to promptly identify the existence of, and more accurately diagnose the cause for, a failure in the charging system.

BRIEF DESCRIPTION OF THE DRAWINGS

Additional objects and advantages of the present invention will become apparent from a reading of the following detailed description of the preferred embodiment which makes reference to the drawings of which:

FIG. 4 is an exemplary battery temperature versus battery voltage set point curve used in the preferred embodiment of the present invention.

DETAILED DESCRIPTION OF THE PREFERRED EMBODIMENT

Figure 1:
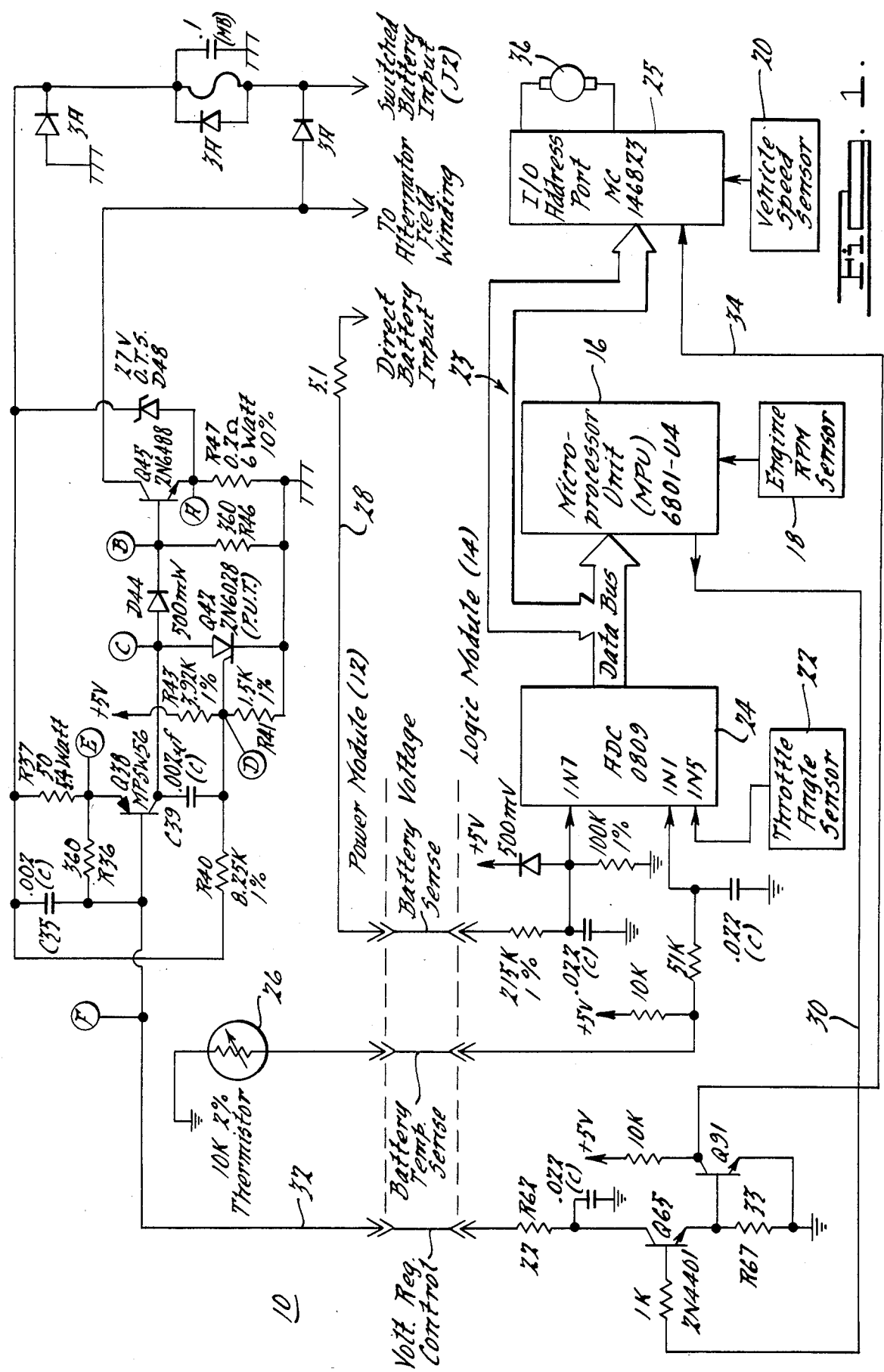
FIG. 1 is a circuit diagram of the power module and logic module as it pertains to the present invention.

Referring to FIG. 1, a circuit diagram of the portions of the power module 12 and the logic module 14 pertaining to the charging system 10 according to the present invention are shown. In practice, the logic module 14 will include additional circuitry relating to the electronic control of the engine. In that these additional control functions of the logic module do not relate to the present invention, they have been eliminated from the circuit diagram for purposes of clarity. In addition, the power module 12 in practice will include additional high current circuitry relating to such functions as the power supply, driver circuitry for controlling the energization of injectors in a fuel-injected engine, etc. Again, this additional circuitry has been deleted for clarity from the circuit diagram in FIG. 1 as it does not relate to the subject matter of the present invention.

At the heart of the logic module is an integrated circuit microprocessor unit (MPU) 16 which provides the intelligence for the logic module 14. The MPU 16 is adapted to receive input signals from various sensors relating to engine RPM, vehicle speed, throttle angle, battery voltage, and battery temperature. In particular, the MPU 16 in the preferred embodiment senses engine RPM directly from a Hall-effect sensor device 18 integral to the distributor of the vehicle. In addition, vehicle speed information is provided to the MPU 16 via parallel interface 25 from a distance sensor 20 connected in series with the speedometer of the vehicle. Note, that parallel interface 25 merely serves as a means of expanding the number of input/output address ports available to the MPU 16. Accordingly, signals provided to parallel interface 25 can be considered connected directly to an I/O port of MPU 16.

Throttle angle, battery voltage, and battery temperature are sensed indirectly by the MPU 16 through an analog-to-digital converter 24 which converts the analog signals received at its various input ports IN0-IN7 to digital signals that are provided to the MPU 16 on data bus 23. Specifically, analog-to-digital converter (ADC) 24 receives a first analog signal at one input port from a thermistor 26 which provides a signal indicative of battery temperature. A second analog signal corresponding to the voltage at the positive terminal of the battery is provided to another input of ADC 24 from a battery voltage sense line 28. In addition, a third analog signal indicative of the position of the throttle is provided to another input port of ADC 24 by a throttle potentiometer 22 which is connected to the throttle blade of a throttle-body assembly of a conventional fuel injection system.

As will be appreciated by those skilled in the art, alternative means may be advantageously employed to provide the appropriate feedback information to the MPU 16 to achieve the stated purposes of the present invention. For example, to detect vehicle deceleration, a brake signal that is produced whenever the brakes are applied may be used in place of the speed sensing device 20. Alternatively, manifold pressure may be monitored to obtain comparable information. Similarly, the throttle angle sensor 22 may be replaced by a sensor responsive to high manifold pressure to detect when the internal combustion engine is being heavily loaded. Or, the throttle angle sensor 22 may be additionally utilized to indicate when the internal combustion engine is in an idle condition.

The thermistor 26 in the present invention is mounted directly to the printed circuit board in the power module 12 and the power module is preferrably mounted in the engine compartment of the vehicle adjacent to the battery so that the temperature sensed by the thermistor 26 closely approximates the temperature of the battery. More particularly, by insuring that the temperature device, thermistor 26, is located away from the alternator or other engine components that can generate substantial heat, and also outside the direct air stream from the radiator fan, the temperature signal received by the MPU 16 in the present charging system more precisely tracks the actual temperature of the battery.

In addition, it will be recognized that by virtue of the fact that the battery voltage sense line 28 is connected to an integrated circuit analog-to-digital converter 24 which presents a very high input impedance, it is therefore possible to connect the battery voltage sense line 28 directly to the positive terminal of the battery without causing an excessive current drain on the battery when the ignition is off. Accordingly, it can be seen that the battery voltage signal supplied to the MPU 16 in the present charging system will precisely correspond to the actual voltage of the battery at its positive terminal and not be affected by the energization of other loads supplied by the battery from source points connected through the ignition switch.

In general, the MPU 16 of the logic module 14 is adapted to monitor the temperature of the battery via the battery temperature sense signal supplied by thermistor 26, and determine therefrom the appropriate battery voltage set point corresponding to the desired voltage level to which the battery should be charged. In other words, and with particular reference to FIG. 4, the MPU 16 has stored therein a "chart", which essentially comprises a lookup table which specifies a particular desired battery voltage for a given battery temperature. Thus, for example, looking at the graph shown in FIG. 4, for a battery temperature of approximately 40° C., the desired battery voltage set point would correspond to 14 volts. Importantly, it will be noted that the voltage versus temperature curve programmed into the MPU 16 in the present system provides upper and lower battery voltage limits to prevent damage to the vehicle lighting system or other components on the vehicle which are sensitive to battery voltage. As is well known to those skilled in the art, existing voltage regulators typically contain linear compensation devices which do not provide voltage limit protection at extreme battery temperatures. Accordingly, it is possible with prior art voltage regulators to attain battery voltages which are either too high or too low depending upon the slope of the curve selected. Accordingly, to guard against such potential problems, the slope of the temperature versus voltage curve selected for use in a conventional voltage regulator typically represents a compromise between performance and such temperature extreme concerns. The charging system according to the present invention overcomes this drawback by utilizing the flexibility of the MPU 16 to configure the voltage versus temperature curve so that the slope is selected for optimum performance while protection against temperature extremes is provided via the voltage limits programmed into the curve.

As indicated previously, the MPU 16 is initially programmed to select the appropriate battery voltage set point in accordance with the sensed battery temperature. In addition, as will be described more fully in connection with the flowchart diagram in FIG. 2, the MPU 16 is additionally programmed to alter the battery voltage set point in accordance with the various additional sensed parameters relating to the engine RPM, vehicle speed, and throttle angle. Once the battery voltage set point is determined, the MPU is then programmed to compare the "desired" battery voltage with the battery voltage sense signal from line 28 to ascertain whether the voltage at the positive terminal of the battery is within a prescribed tolerance range of the battery voltage set point. If the sensed battery voltage signal is below the prescribed tolerance range of the battery voltage set point, the MPU 16 is programmed to energize the field windings of the alternator to thereby supply charging current from the alternator to the battery until such time as the sensed battery voltage attains the desired battery voltage set point level.

Returning to the circuit diagram in FIG. 1, this control procedure is accomplished in the following manner. When the analog battery voltage sense signal on line 28 is below the prescribed battery voltage set point, the MPU 16 produces a HI output signal on line 30 which is provided to the base of a transistor Q65, thereby turning on the transistor. With transistor Q65 conducting, transistor Q38 is similarly turned on and power transistor Q45, which has its collector and emitter terminals connected between the alternator field windings and ground is then rendered conductive. The energization of power transistor Q45 results in the application of current to the alternator field windings which in turn gives rise to a charging current being supplied from the alternator to the battery in a conventional manner. The MPU 16 continues to monitor the battery voltage signal provided on sense line 28 until the battery voltage has been brought up to the desired voltage set point level. When this occurs, the MPU 16 produces a LO signal on output line 30 which removes the bias supplied to the base of transistor Q65 and turns off the transistor. With transistor Q65 rendered non-conductive, transistor Q38 is also turned off which in turn causes power transistor Q45 5o be rendered non-conductive, thereby terminating the flow of current to the alternator field windings. To summarize, therefore, when a HI output pulse is produced on line 30 by MPU 16, transistors Q65, Q38, and Q45 are rendered conductive, current is supplied to the alternator field windings, and the battey is charged by the alternator. When a LO output signal is produced on line 30 by MPU 16, transistors Q65, Q38, and Q45 are rendered non-conductive, thus blocking current flow to the alternator field windings and no charging of the battery occurs. In practice, this cycling on and off of power transistor Q45 may occur many times per second and serves to modulate the alternator field current to maintain an appropriate charge on the battery.

In order to protect output transistor Q45 from an over-current condition, the power module 12 according to the present invention includes circuitry which is adapted to sense an over-current condition and immediately turn off transistor Q45. In particular, a current sensing resistor R47 is connected in series with the alternator field windings between the emitter of Q45 and ground. Accordingly, the voltage drop across resistor R47 is directly proportional to the amount of current flowing through the alternator field windings. When the voltage drop across current sensing resistor R47 exceeds a predetermined threshold value, programmable unijunction transistor (PUT) Q42 is turned on, thereby shorting to ground the bias voltage provided to the base of the transistor Q45 and turning the transistor Q45 off.

To understand how this takes place, it is necessary to recognize that for a given current flow through transistor Q45 and resistor R47, the voltage drop between test points A and B, B and C, C and E, and E and F will be constant. It necessarily follows, therefore, that the voltage drop between test points A and E is constant and essentially independent of the amount of alternator field current flowing through transistor Q45. Accordingly, as the alternator field current increases, the voltage drop across resistor R47 will increase, and consequently the voltage at test points B, C, E and F will increase by the same value. Thus, it will be appreciated that when the voltage at the anode of PUT Q42 (test point C) exceeds a predetermined threshold, determined by the battery voltage and the resistance values of resistors R40, R41, and R43 in the voltage divider network connected to the gate of PUT Q42, PUT Q42 will be rendered conductive to thereby turn off power transistor Q45. In the preferred embodiment, the voltage at test point C must exceed the voltage at test point D by nominally 0.7 volt for PUT Q42 to be rendered conductive. The appropriate circuit values are preferrably selected so that this occurs when the current through power transistor Q45 exceeds approximately 5 to 6.6 amps at a nominal battery voltage of 14 volts. Note that due to the fact that resistor R40 is tied to the battery input, this threshold value will vary in accordance with battery voltage.

In addition, it will be noted that when power transistor Q45 is turned off by the conduction of PUT Q42 in response to an over-current condition in the alternator field windings, the signal at test point F will be low enough to render transistor Q91 non-conductive despite the existence of a HI output signal on line 30 from MPU 16. The present charging system is adapted to recognize this condition as indicative of a fault in the system. In particular, the emitter of transistor Q65 is supplied to the base of transistor Q91 which has its collector and emitter terminals connected between +5 volts and ground. The collector of transistor Q91 is also connected via line 34 to an input port of MPU 16 through parallel interface 25. Accordingly, when transistor Q91 is on, a LO signal is provided to the input port of MPU 16 and when transistor Q91 is off, a HI signal is provided to the input port of MPU 16.

The diagnostic function of transistor Q91 is performed in the following manner. When transistor Q65 is turned off, transistor Q91 will of course be similarly rendered non-conductive. However, when transistor Q65 is turned on, transistor Q91 will only be rendered conductive if there exists a sufficient potential at test point F. As previously explained, the voltage at test point F is dependent upon the amount of field current flowing through current sensing resistor R47. In the preferred embodiment, a voltage signal at test point F of sufficient potential to turn on diagnostic transistor Q91 is assured when a field current of two amperes is flowing through sensing resistor R47. During normal operation of the charging system 10, two amperes field current represents a worse case condition. Thus, if transistor Q91 is turned on when transistor Q65 is conducting, output transistor Q45 is presumed to be conducting and the charging system functioning properly. However, if transistor Q91 is turned off when transistor Q65 is on, the presumption is that a fault exists somewhere in the power module circuit 12. In this regard, it should be recognized that, since the feedback signal at test point F is effected by a short to ground anywhere in the power module circuit 12 downstream from test point F, the diagnostic transistor Q91 serves to monitor the proper functioning of the entire output circuit of the power module 12.

The MPU 16 is programmed to detect the occurrence of this fault condition by examining the output signal on line 30 supplied to the base of transistor Q65 and the input signal on line 34 from the collector of transistor Q91 (following a specified delay as described below). Specifically, whenever the output signal from the MPU 16 on line 30 and the signal from diagnostic transistor Q91 on line 34 are both HI at the same time, the MPU is programmed to presume therefrom the existence of a fault condition in the charging system and signal the operator of the vehicle accordingly.

Figure 2:
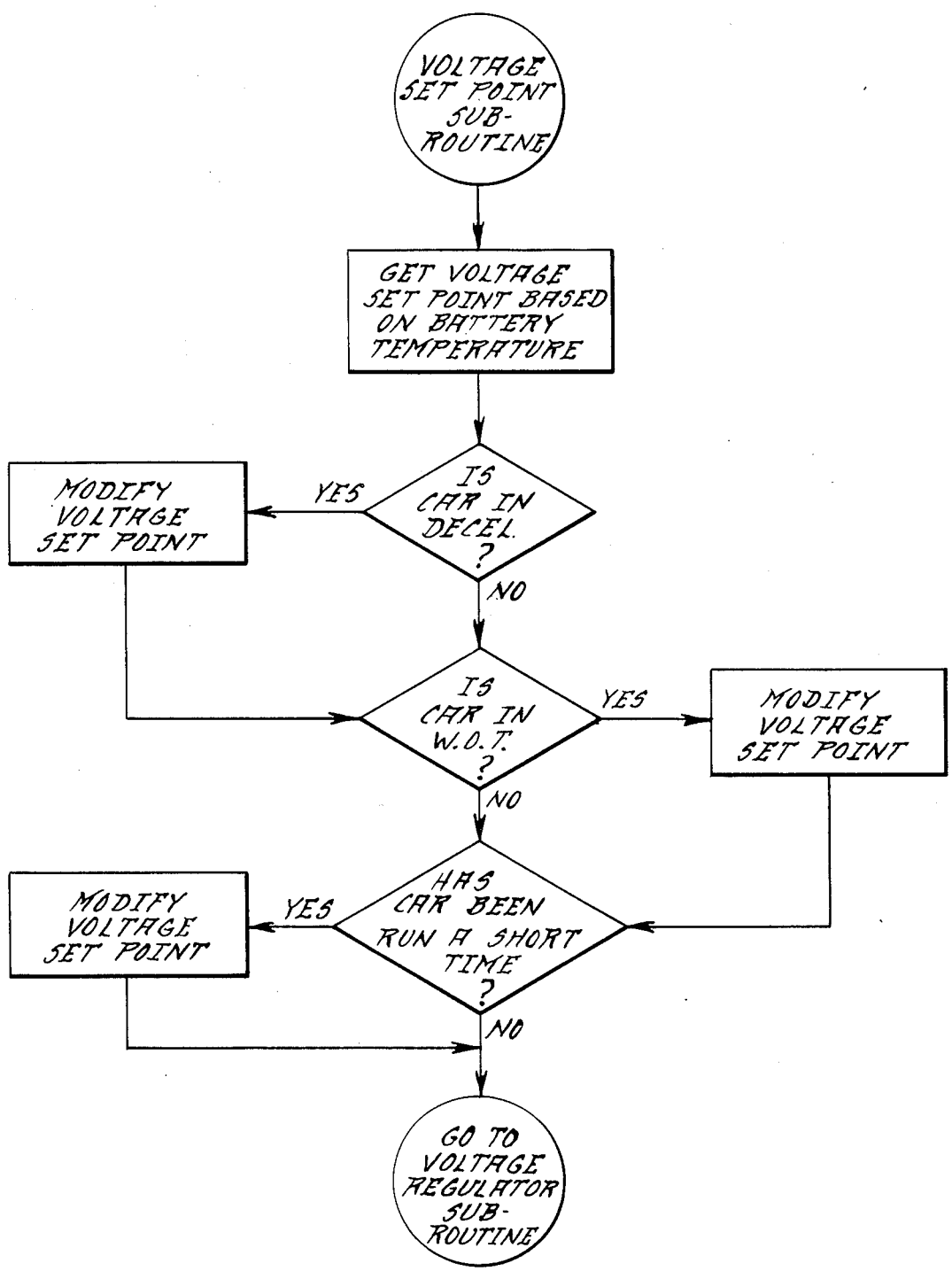
FIGS. 2 and 3 are flowchart diagrams of the software programming for the microprocessor in the logic module shown in FIG. 1.
Figure 3:
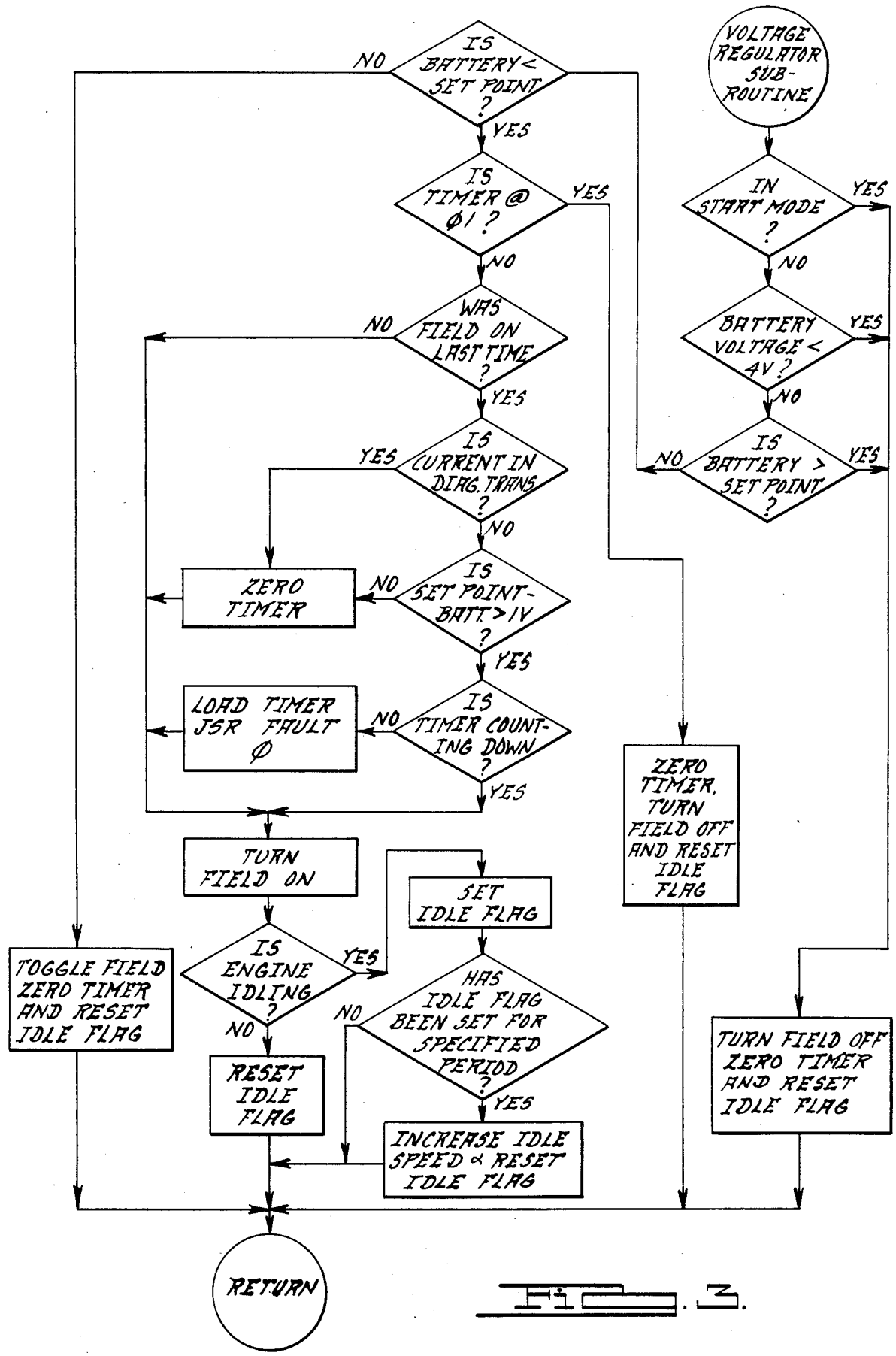

Turning now to FIGS. 2 and 3, flowchart diagrams relating to the software programmed into the MPU 16 in accordance with the present invention are shown. Referring initially to FIG. 2, to implement the voltage regulation function the MPU 16 as previously noted is initially programmed to ascertain the appropriate voltage set point based upon the temperature of the battery as sensed by the signal received from thermistor 26. Specifically, the MPU 16 is programmed to refer to the "look-up table" of values stored in its memory which correspond to the battery voltage versus battery temperature curve illustrated in FIG. 4. Upon ascertaining the appropriate voltage set point based upon the sensed battery temperature, the MPU is then programmed to determine whether the voltage set point should be altered in accordance with additional sensed conditions relating to various operating characteristics of the vehicle. In particular, the MPU 16 is programmed to initially interrogate the vehicle speed sensor 20 to determine if the vehicle is in a deceleration condition. If the vehicle is decelerating, the MPU is programmed to increase the voltage set point a predetermined amount so that the alternator will charge the battery to a higher than normal voltage level to take advantage of the stored energy represented by the momentum of the vehicle which is normally wasted as heat during braking.

Next, the MPU 16 is programmed to interrogate the throttle (WOT) angle sensor 22 to ascertain whether the throttle is in the wide-open position. If such a condition is present, the presumption is that the operator of the vehicle is demanding maximum output from the engine and therefore it is desirable to eliminate or reduce to the extent possible the auxiliary loads placed on the engine. Accordingly, when the MPU 16 senses a wide-open throttle condition, the MPU 16 is programmed to reduce the voltage set point so that the additional loading placed on the engine by the alternator is minimized.

Continuing with the Voltage Set Point subroutine, the MPU 16 is next programmed to ascertain whether the engine has been running for only a short period of time since initial start-up. Under such circumstances, it is desirable to charge the battery voltage to a higher than normal level so that the charge on the battery is replenished as rapidly as possible following engine cranking, which constitutes the most significant drain on the battery. Otherwise, brief vehicle operation, especially successive periods of brief vehicle operation, may result in excessive depletion of battery charge. Therefore, during the initial minutes of operation of the vehicle, the MPU is programmed to increase the voltage set point to increase the charging rate of the battery.

Once the appropriate voltage set point has been determined, the MPU 16 is programmed to then proceed to the Voltage Regulator subroutine. If the vehicle is in the start-up mode with the engine cranking, no control of the alternator is possible. Therefore, the field is turned off and the MPU 16 returns to the main control program (not shown). If the engine is not in the start mode, the MPU is programmed to interrogate the battery voltage sense line 28 (FIG. 1) to determine if the battery voltage is less than 4 volts. Because the voltage regulation system cannot function when the battery voltage is below 4 volts, the presumption in such a situation is that there exists a fault in the battery voltage sense line 28. When such a condition occurs, normal control operation is not possible and the MPU 16 is accordingly programmed to turn off the alternator field windings and go to a "LIMP IN" mode (not shown) wherein an operator warning light is turned on and the battery is charged on a nominal duty cycle to permit marginal operation of the vehicle so that the operator can seek an appropriate repair facility.

Assuming operation of the vehicle has proceeded beyond initial start-up and the battery voltage sense line 28 is functioning properly, the MPU 16 is programmed to compare the battery voltage signal from sense line 28 to the voltage set point value previously ascertained from the Voltage Set Point subroutine. If the sensed battery voltage level is greater than the set point value, the battery does not need to be charged and the field is turned off and the MPU 16 proceeds to the main control program. If, however, the battery voltage is equal to the set point, the alternator field windings are "toggled"—i.e., turned on if previously off and turned off is previously on.

If the sensed battery voltage is less than the desired set point, the battery needs to be charged and the MPU 16 is accordingly programmed to energize the alternator field windings. However, before reaching this point in the subroutine, the MPU 16 in the preferred embodiment runs a diagnostic check to insure that the system is functioning properly. Specifically, if the sensed battery voltage is below the set point and the field is already turned on from the previous pass through the subroutine, diagnostic transistor Q91 should be conducting current. Accordingly, MPU 16 is programmed at this point to interrogate diagnostic transistor Q91. If diagnostic transistor Q91 is properly conducting current, the MPU 16 will continue to energize the field windings and then return to the main program. On the other hand, if diagnostic transistor Q91 is not conducting current under such circumstances, the possibility of a fault condition exists.

However, because it is desirable to be as certain as possible of the existence of a fault condition, before signalling the operator of the vehicle, the MPU 16 in the preferred embodiment is further programmed to make an additional check before presuming the existence of a fault condition. Specifically, the MPU 16 additionally checks to see if the sensed battery voltage is within one volt of the desired set point. If the battery voltage is within this defined tolerance of the set point, the MPU will simply continue to energize the field and monitor the operation of the charging system in the manner described above. On the other hand, if the difference between the desired set point and the sensed battery voltage is more than one volt, then the MPU 16 presumes a fault condition and "jumps" to the fault subroutine (not shown).

Additionally, it will be noted from the flowchart diagram in FIG. 3 that the MPU 16 in the present invention is also programmed to interrogate the engine RPM sensor 18 during the Voltage Regulation subroutine to determine if the engine is idling. As is well known to those skilled in the art, it is possible when in an idle condition to have presented a situation wherein, due to the simultaneous operation of various accessory loads, the alternator is unable to raise the battery voltage to the desired set point level despite the field windings of the alternator being fully energized. This is due to the fact that the current output of the alternator is speed dependent and therefore limited when the engine is idling. To compensate for such an occurrence, the MPU 16 is programmed to monitor the period during which the field windings are energized when the engine is idling and to increase the idle speed of the engine if it becomes apparent that the current output of the alternator is not sufficient to adequately charge the battery.

Specifically, whenever the field windings are turned on, the MPU 16 interrogates the engine RPM sensor 18 to ascertain whether the engine is in an idle condition. If the engine is idling, a flag is set which is then used to monitor the period over which the field is energized during the idle condition. If this period exceeds a specified limit, the presumption is that the current output of the alternator is not sufficient to adequately charge the battery and the idle speed of the engine is increased accordingly by energizing an idle speed motor 36 (FIG. 1).

Finally, as indicated in the flowchart diagram in FIG. 3, the preferred embodiment of the present invention includes a free running timer that is reset each time a signal is produced by the MPU 16 on line 30 to energize the alternator field windings. In particular, the timer is preset in the preferred embodiment to a preselected number and counted down therefrom so as to define a time period of approximately 250-500 milliseconds. The time period is intended to represent more than sufficient time to insure that the field has in fact become energized following production by the MPU 16 of a field energization signal on line 30. Therefore, if diagnostic transistor Q91 has not begun to conduct current by the time the timer has counted down to "1", the MPU 16 is programmed to automatically turn off the field to prevent overcharging of the battery. Additional protection means may also be included in the software—such as a counter that is preset and periodically incremented and/or decremented while the field is energized until a specified count is obtained—to further insure against overcharging of the battery in the event the voltage regulation control program gets "hung up" in a control loop.

While the above description constitutes the preferred embodiment of the invention, it will be appreciated that the invention is susceptible to modification, variation and change without departing from the proper scope of fair meaning of the accompanying claims.

I claim:

1. In a charging system for a vehicle powered by an internal combustion engine including an alternator driven by the internal combustion engine for supplying a charging current to the battery of the vehicle whenever the field windings of the alternator are excited by a supply of current therethrough; an improved voltage regulation system for controlling the excitation of said field windings in accordance with the voltage level of said battery, including:
   means for providing a battery voltage signal on a first sense line related to the voltage level at the positive terminal of the battery;
   means for providing a temperature signal on a second sense line related to the temperature of the battery;
   power switching means for controlling the supply of current through said alternator field windings; and
   logic control means located remote from said power switching means and including an integrated circuit microprocessor connected to said first and second sense lines and to said power switching means via a control line and programmed to determine in accordance with the temperature signal on said second sense line the desired battery voltage level, compare the desired battery voltage level with the actual battery voltage level as determined from said first sense line, and control the actuation of said power switching means by producing a control signal on said control line in accordance with said comparison;
   said microprocessor being further programmed to control the operation of said internal combustion engine;
   said logic control means further including diagnostic circuit means connected between said control line and said microprocessor for detecting when said power switching means is not conducting current through the field windings of the alternator despite the production of said control signal by said microprocessor.

2. The voltage regulation system of claim 1 wherein said battery voltage and temperature signals on said first and second sense lines are analog signals and said logic control means further includes analog-to-digital conversion means connected between said first and second sense lines and said microprocessor for converting the analog signals on said first and second sense lines to corresponding digital signals which are then supplied to said microprocessor.

3. The voltage regulation system of claim 2 wherein said second sense line is connected directly to the positive terminal of the battery.

4. The voltage regulation system of claim 1 wherein said microprocessor is also used to control the operation of said internal combustion engine.

5. The voltage regulation system of claim 1 wherein said power switching means further includes current sensing means connected in circuit with the alternator field windings for providing a signal related to the amount of current flowing through the alternator field windings and overload protection means responsive to the signal from said current sensing means to deactuate said power switching means to remove current from the alternator field windings in an over-current situation.

6. The voltage regulation system of claim 2 wherein said means for providing said temperature signal comprises a thermistor that is connected to the printed circuit board containing said power switching means.

7. The voltage regulation system of claim 1 wherein said microprocessor is programmed to determine the desired battery voltage level based upon a predetermined inverse first order relationship between battery temperature and desired battery voltage, and further wherein said microprocessor has programmed therein a maximum desired battery voltage level which establishes the maximum voltage level to which the battery will be charged regardless of how low the value of said temperature signal and a minimum desired battery voltage level which establishes the minimum voltage level to which the battery will be charged regardless of how high the value of said temperature signal.

8. In a charging system for a vehicle powered by an internal combustion engine including an alternator driven by the internal combustion engine for supplying a charging current to the battery of the vehicle whenever the field windings of the alternator are excited by a supply of current therethrough; an improved voltage regulation system for controlling the excitation of said field windings in accordance with the voltage level of said battery, including:

a power module mounted in the vehicle in a location where the ambient temperature approximates the temperature at the battery and comprising solid-state power switching means connected to the field windings of the alternator for controlling the application of current through the alternator field windings in response to a control signal supplied to said power module on a control line, and a temperature transducer for providing a temperature signal on a temperature sense line related to the ambient temperature at said power module;

an unswitched battery voltage sense line connected to the positive terminal of the battery for providing a battery voltage signal; and a logic module connected to said control line, said temperature sense line, and said battery voltage sense line and comprising an analog-to-digital converter having a high input impedance for converting the analog signals on said temperature and battery voltage sense lines to corresponding digital signals, and an integrated circuit microprocessor programmed to determine in accordance with said temperature signal the desired voltage level of the battery, compare said desired voltage level with said battery voltage signal, and produce said control signal on said control line in accordance with said comparison;

said logic module further including diagnostic circuit means connected between said microprocessor and said control line for detecting when said power switching means is not conducting current through the alternator field windings despite the production of said control signal by said microprocessor.

9. The voltage regulation system of claim 8 further including means for detecting vehicle deceleration and producing a deceleration signal in response thereto.

10. The voltage regulation system of claim 9 wherein said microprocessor is further programmed to increase said desired voltage level in response to said deceleration signal.

11. The voltage regulation system of claim 8 wherein said microprocessor is further programmed to monitor the duration of operation of the internal combustion engine and increase said desired voltage level during the initial predetermined period of operation following start-up.

12. The voltage regulation system of claim 8 further including means for detecting when the internal combustion engine is operating in a heavily loaded condition and producing a WOT signal in response thereto.

13. The voltage regulation system of claim 12 wherein said microprocessor is further programmed to decrease said desired voltage level in response to said WOT signal.

14. The voltage regulation system of claim 8 further including means for providing an RPM signal related to the rotational speed of the internal combustion engine and idle speed control means for controlling the idle speed of the internal combustion engine.

15. The voltage regulation system of claim 14 wherein said microprocessor is connected to said idle speed control means and is further programmed to determine in accordance with said RPM signal when the internal combustion engine is idling and provide a signal to said idle speed control means to increase the idle speed of the internal combustion engine when it is determined from said comparison to be necessary to properly raise the voltage of the battery to said desired voltage level.

16. The voltage regulation system of claim 8 wherein said microprocessor is also used to control the operation of the internal combustion engine.

17. In a charging system for a vehicle powered by an internal combustion engine including an alternator driven by the internal combustion engine for supplying a charging current to the battery of the vehicle whenever the field windings of the alternator are excited by a supply of current therethrough; an improved voltage regulation system for controlling the excitation of said field windings in accordance with the voltage level of said battery, including:

means for providing a battery voltage signal on a first sense line related to the voltage level of the battery;

power circuit means connected to the field windings of the alternator for controlling the application of current through the alternator field windings in response to a control signal supplied to said power circuit means on a control line, and including circuit means for providing a feedback signal on said control line indicative of the proper functioning of said power circuit means; and logic control means connected to said control line and to said first sense line for producing a control signal on said control line in accordance with said battery voltage signal, and including diagnostic circuit means connected to said control line and responsive to said feedback signal for detecting a fault condition in said power circuit means.

18. The charging system of claim 17 wherein said power circuit means is located remote from said logic control means.

19. The charging system of claim 18 wherein said feedback signal is produced on said control line whenever current is applied to the field windings of the alternator by said power circuit means.

20. The charging system of claim 19 wherein said diagnostic circuit means is adapted to detect the absence of said feedback signal despite the presence of said control signal.

21. The charging system of claim 20 wherein said logic control means includes a microprocessor responsive to said battery voltage signal for producing said control signal on an output line therefrom, and said diagnostic circuit means includes a first transistor connected between said output line from said microprocessor and said control line and adapted to be actuated in response to the production of said control signal from said microprocessor and deactuated despite the presence of said control signal from said microprocessor by the absence of said feedback signal on said control line and a second transistor connected to said first transistor and responsive to the de-actuation of said first transistor for producing a second signal which is provided to said microprocessor, said microprocessor being further responsive to said second signal when said control signal is being produced on said output line for detecting a fault condition in said power circuit means.

22. The charging system of claim 17 wherein said power circuit means further includes current sensing means connected in circuit with the alternator field windings for providing a signal related to the amount of current flowing through the alternator field windings and overload protection means responsive to the signal from said current sensing means to deactivate said power circuit means to remove current from the alternator field windings in an overcurrent situation.

* * * * *